United States Patent [19]

Ray et al.

[11] 4,206,798

[45] Jun. 10, 1980

[54] APPARATUS FOR FORMING TRACTION GROOVES IN THE UNCURED TREAD OF A HEAVY OFF-HIGHWAY TIRE AND METHOD THEREFORE

[75] Inventors: Gilbert W. Ray; Max D. Brinkley, both of North Canton, Ohio

[73] Assignee: The Goodyear Tire & Rubber Company, Akron, Ohio

[21] Appl. No.: 916,316

[22] Filed: Jun. 16, 1978

[51] Int. Cl.$^2$ ............................................. B29H 21/08
[52] U.S. Cl. ........................................................ 157/13
[58] Field of Search .......................................... 157/13

[56] References Cited

U.S. PATENT DOCUMENTS

| | | | |
|---|---|---|---|
| 3,075,575 | 1/1963 | Orenduff | 157/13 |
| 3,589,427 | 6/1971 | Love | 157/13 |
| 4,080,230 | 3/1978 | Batchelor et al. | 157/13 X |
| 4,081,017 | 3/1978 | Appleby et al. | 157/13 |

*Primary Examiner*—James G. Smith

*Attorney, Agent, or Firm*—R. S. Washburn

[57] ABSTRACT

An apparatus having a grooving tool for carving grooves in a tire tread drives the tool transversely of the tread while varying the elevation of the tool so as to carve curvate, chevron, herringbone, lazy-S, or other non-linear grooves. Means for orienting the cutting edge of the tool normal to the actual direction of traversing movement is disclosed. The elevation of the tool is controlled by a sensor which follows the template profile or contour as the tool travels. The orientation of the tool is also controlled by a sensor cooperating with a template. The apparatus includes a base adapted for movement to grooving relation with a tire mounted on a rotatable chuck or away from the tire. The foregoing abstract is not to be taken as limiting the invention of this application, and in order to understand the full nature and extent of the technical disclosure of this application, reference must be made to the accompanying drawing and the following detailed description.

7 Claims, 4 Drawing Figures

APPARATUS FOR FORMING TRACTION GROOVES IN THE UNCURED TREAD OF A HEAVY OFF-HIGHWAY TIRE AND METHOD THEREFORE

The present invention relates to forming traction grooves in the uncured tread of a heavy off-highway tire and particularly to forming such traction grooves the forms of which are angled or curved obliquely with respect to the mid-circumferential plane of such tire.

In a prior application, now U.S. Pat. No. 4,081,017 held by the assignee of this application, there was disclosed an apparatus capable of cutting grooves in the uncured tread of a heavy tire which grooves were cut linearly at angles from 90 degrees to 0 degrees with respect to the mid-circumferential plane of the tire. The prior apparatus, however, could not form grooves in the tread of the tire which were non-linear, for example, having a herringbone pattern or a lazy-S pattern across the tread.

The present apparatus has been developed to overcome this disadvantage.

The objects of the invention are accomplished by an apparatus for forming grooves in a tire tread comprising a grooving tool having a single blade cutting edge, first means for moving said grooving tool transversely in the tread of the tire in accordance with a predetermined profile, second means mounting said tool for rotation, and third means coordinated with said first means (for moving) for varying the orientation of said tool in response to changes in slope of said profile as said tool is moved transversely of the tire.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
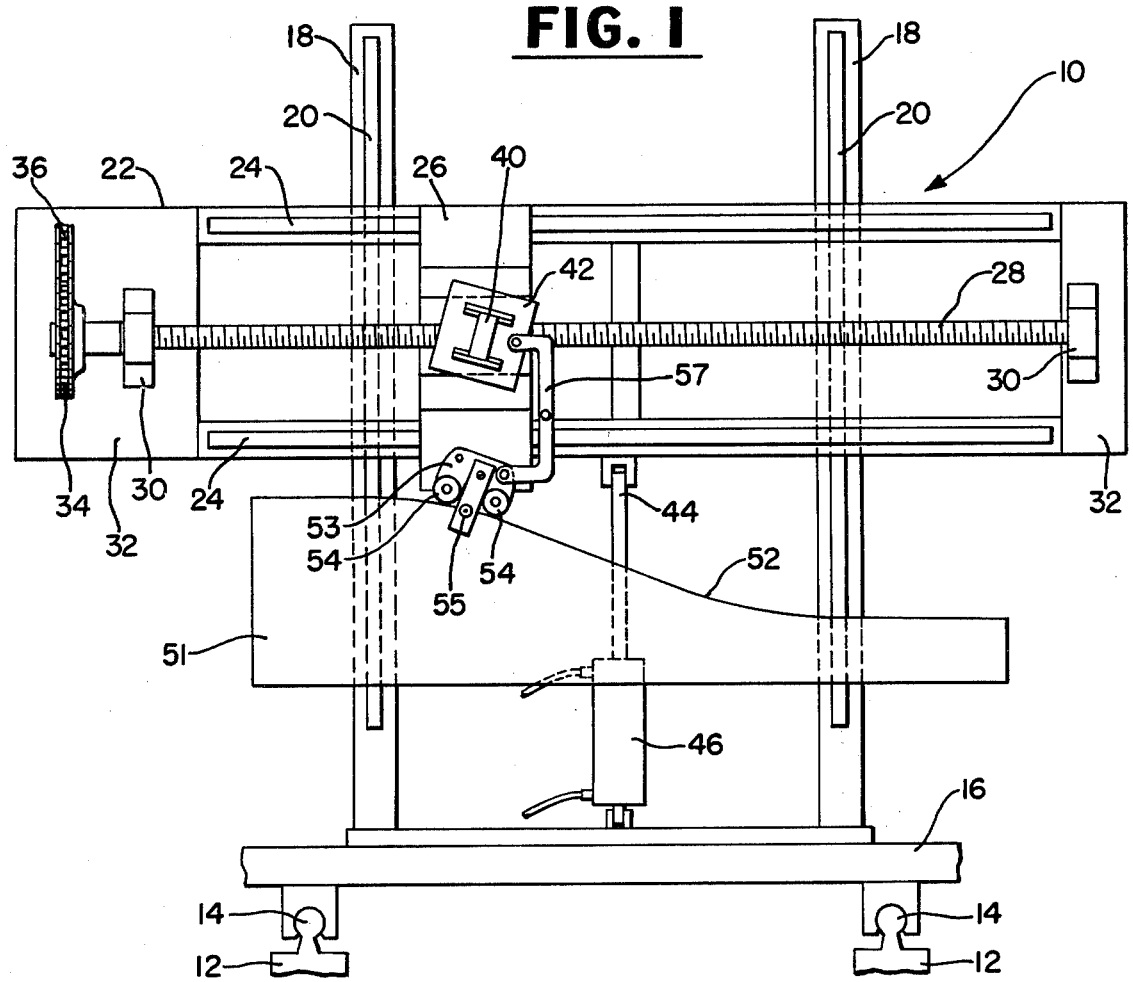
FIG. 1 illustrates a first embodiment of the invention.

Making reference to the drawings and particularly to FIG. 1, the apparatus 10 includes a base 12 having a pair of parallel rails 14 oriented peripendicularly with respect to the axis of a tire to be grooved. A platform 16 having slide bearings is slidable on the rails toward and away from the tire and carries thereon a vertical frame 18 having a vertical slide provided by a pair of parallel rails 20 extending vertically and perpendicularly with respect to the first-mentioned rails. A cross-frame 22 having slide bearings slidably engaging the vertical rails 20 carries a horizontal slide provided by a pair of parallel rails 24 which extend parallel to the axis about which the tire is rotatable. A carriage 26 having slide bearings slidable on the horizontal rails 24 is provided with a nut which engages a traverse screw 28 mounted rotatably in bearings 30 fixed on the end plates 32 of the cross-frame. An extension of the screw carries a sprocket 34 which is connected by roller chain 36 to a sprocket on the shaft of a drive motor (not shown) by which the screw is rotated to drive the carriage transversely of the tread of the tire.

A heatable grooving tool 40 formed of a sharpened blade having generally U-shaped configuration is secured at the ends of the U-configuration to a tool holder 42 which is mounted rotatably about a pivot shaft fixed in the carriage. The grooving tool is thereby rotated to maintain its orientation with the direction of the groove being formed in the tread.

The cross-frame 22 is connected to the piston rod 44 of a hydraulic cylinder 46 the head end of which is pivotally connected to the platform 16 so that by controling the fluid flow to the hydraulic cylinder the cross-frame can be moved in directions parallel to the midcircumferential plane of the tire while the blade is being moved transversely of the tire by the screw 28.

To control the elevation of the cross-frame and the tool carried thereon a flat plate template 51 having a profile 52 is fixed relative to the platform by a suitable clamp (not shown). A template follower 53 having a spaced pair of rollers 54 connected to the tool holder carries a photoelectric sensing device 55 the signals from which are transmitted to control valve means controlling the flow of fluid to the hydraulic cylinder 46 so that the cross-frame 22 is raised or lowered on the frame 18 to cause the grooving tool to follow the profile 52 as the carriage is moved by the screw transversely of the tire.

In order to orient the grooving tool 40 so as to maintain its cutting edge perpendicular with respect to the direction of travel while forming the groove, the tool holder 42 is connected to the follower 53 by a link 57 pivotally connected to the tool holder at one of its ends and to the follower at the other of its ends. The movement of the carriage 26 in response to the rotation of the screw and of the cross-frame in response to the hydraulic cylinder 46 causes a compound movement of the grooving tool to cut the desired form in the tread. As the grooving tool travels, the follower 53 is caused to tilt in accordance with the profile of the template. This tilt is communicated to the tool holder by the link in such a manner as to maintain the heated blade edge perpendicular to the direction taken by the compound movement.

Figure 2A:
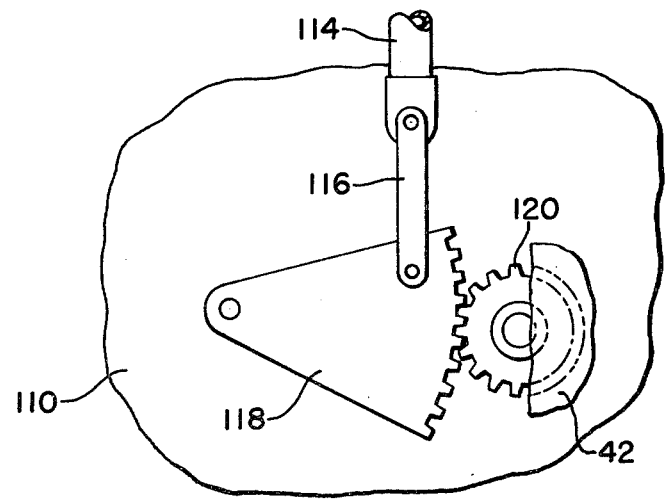
FIG. 2a is a view of a part of the apparatus taken as indicated by 2a—2a of FIG. 2.
Figure 2:
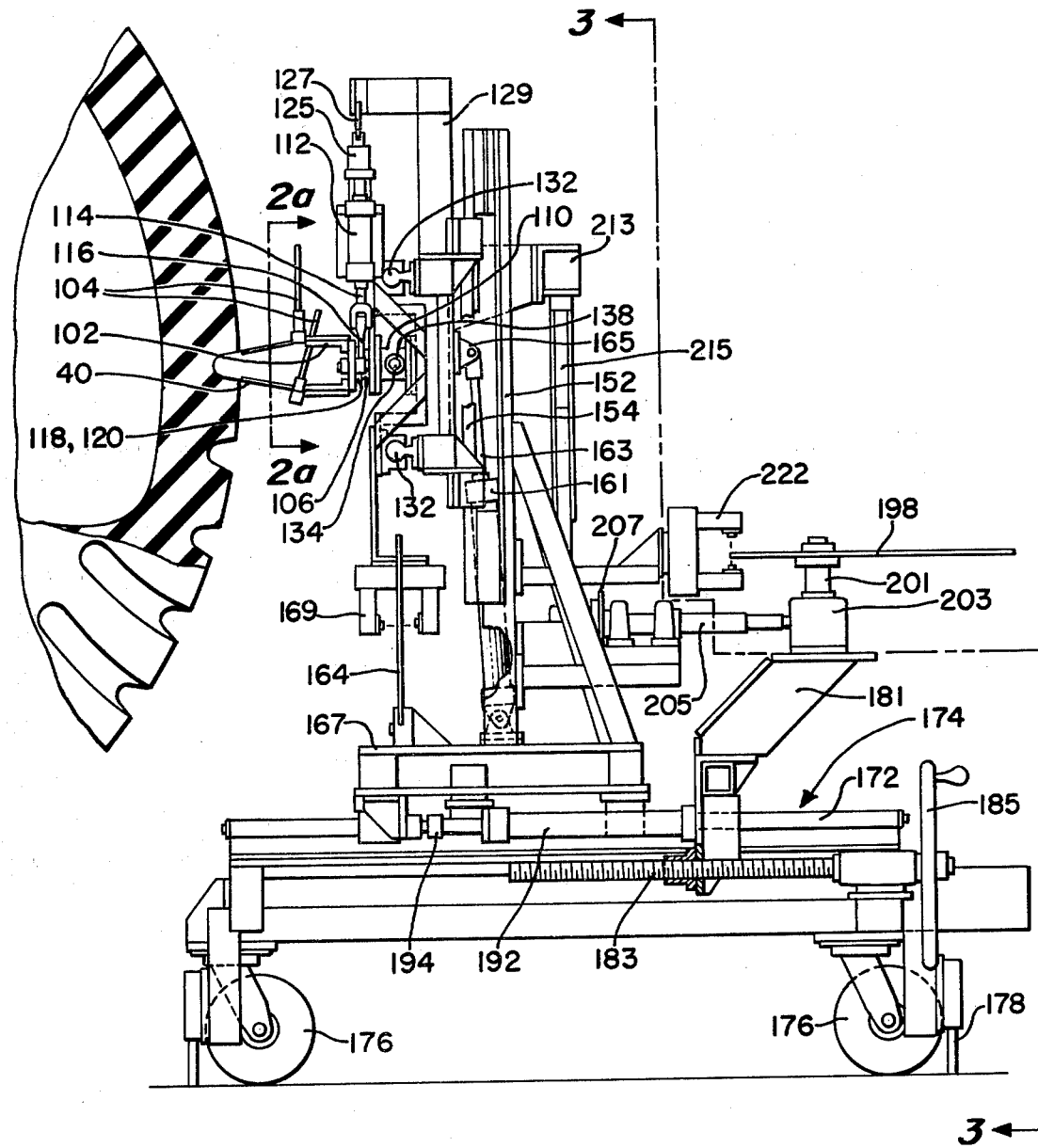
FIG. 2 illustrates in elevation view a second embodiment in greater detail of the apparatus.
Figure 3:
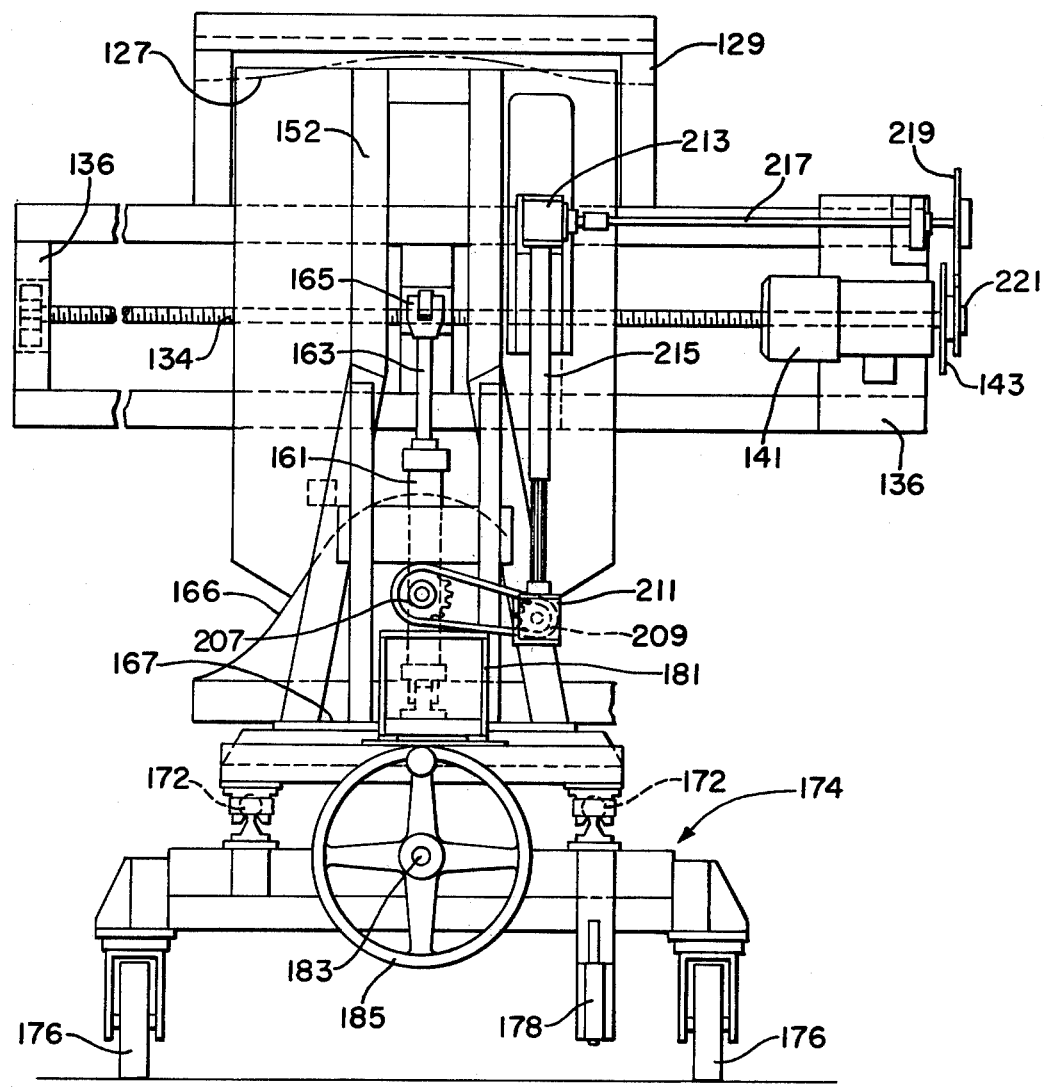
FIG. 3 is a view of the apparatus of FIG. 2, taken as indicated by the line 3—3 of FIG. 2.

Referring now to FIGS. 2 and 3, a preferred embodiment 100 of the apparatus for forming traction grooves in the uncured tread of a heavy, off-highway tire, employs a grooving tool 40 which is formed of a sharpened blade having a generally U-shaped configuration. The configuration of the blade is adapted to suit the desired cross-sectional shape of the traction groove to be formed. Thus, such configurations may have a smaller or larger radius at the tip or may approach a rectangular form, as desired. The grooving tool is fixed on and supported by a tool holder 102 in which the legs of the U are clamped so as to maintain the blade configuration. As the grooving tool is forced through the uncured rubber of the tread, a single slug of uncured rubber is removed so as to pass through the open loop formed by the blade configuration. This slug of material, being uncured, can be returned to the process which provides the uncured rubber to form the tread.

The blade of the grooving tool is provided with electrical resistance heating by means of electrical leads 104 respectively connected to the legs of the blade immediately adjacent the tool holder.

In order to orient the grooving tool with respect to the direction of movement of the tool while it is forming the groove, the tool holder is mounted rotatably on a stub shaft 106 fixed rotatably in a carriage 110.

To rotate the grooving tool to orient the cutting edge normal to the direction of the desired groove in the tire tread, a hydraulic cylinder 112 is fixed on the carriage. The cylinder ram 114 is connected, see FIG. 2a, by a link 116 to a gear segment 118 which meshes with a gear 120 corotatably mounted on the tool holder. The extension or retraction of the ram causes an arcuate movement of the segment, converting the linear motion of the cylinder ram to rotational movement of the grooving tool holder. The hydraulic cylinder is controlled by a hydraulic servo-valve sensor 125 the plunger of which follows the contour of a tool angle template 127 which is fixed on the cross-frame 129 which supports the carriage 110. The tool angle template is a flat plate template the edge of which is shaped to correspond proportionally with the direction of the desired traction groove with respect to the centerplane perpendicular to the tire axis.

To move the grooving tool transversely of the tire tread, the tool holder 102 is affixed to a carriage 110 which is mounted slidably on a pair of rails 132 which extend parallel to the tire axis. A screw 134 rotatably mounted on the end plates 136 of the cross-frame engages a nut 138 fixed in the carriage. The screw is driven by a motor 141 which is connected by a flexible chain drive 143 which encompasses a sprocket on the motor shaft and a second sprocket corotatably mounted on the screw such that the grooving tool is moved by the screw transversely of the tire tread at substantially constant speed. Preferably, the blade of the grooving tool is capable of cutting in either direction and can, therefore, be traversed in either direction in the tread in which the traction grooves are to be formed.

In order to effect relative movement of the grooving tool with respect to the tread on the tire in directions circumferentially of the tire; i.e., parallel to the midcircumferential plane of the tire, while the grooving tool is forming a groove in the tread, the rails 132 are fixed on the cross-frame 129 which is mounted slidably on a vertical frame 152 for sliding movement in a direction perpendicular with respect to the tire axis. The cross-frame has bearings which are slidable on vertical rails 154 fixed on the frame 152 so as to permit the grooving tool to be moved vertically.

To control the vertical movement of the cross-frame so as to effect the movement of the grooving tool circumferentially with respect to the tire, a hydraulic cylinder 161 fixed at its head end in the vertical frame has a ram 163 connected by a clevis 165 to the cross-frame 129 in such a manner that the cross-frame is raised or lowered by fluid pressure in the cylinder 161.

To control the movement of the cross-frame to provide the desired form of the groove in the tread, a flat plate template 164 having a profile track 166 is fixed on the platform 167 of the vertical frame 152. The profile track of the template is formed or selected to correspond with the desired curved or angled form of the traction groove in the tread. Sensing means is provided in the apparatus by a photocell and light arrangement 169 which cooperates with the profile track to control the elevating cylinder 161. The photocell arrangement is fixed to the carriage 110 which moves parallel to the tire axis and the photocell generates signals which are operative, respectively, to raise or to lower the cross-frame and the grooving tool carried thereon in response to the preformed or preselected profile. The arrangement is such that the combination of the movement of the grooving tool parallel to the tire axis caused by the screw combined with the movement circumferentially of the tire provided by the raising and lowering of the cross-frame can generate a traction groove having a curvilinear form comparable in form to a groove formed in a tire tread by molding in a curing mold having shaped projections; but, with significant advantages both in cost and in the avoidance of displacement of the uncured rubber which may be occasioned by forcing the uncured tread into a mold.

In order to move the grooving tool in directions perpendicular to the axis of the tire, the tower or vertical frame 152 is mounted on support means by linear bearings which are slidable on parallel rails 172 supported on a base 174 provided by a rectangular frame weldment. To enable the apparatus to be moved to and away from a tire to be grooved, the base is provided with wheels 176 and additionally with a plurality of retractable locating pins 178 which are adapted to engage in prepositioned floor sockets so as to fix the apparatus in operative relation with a tire.

A bracket or sub-frame 181 is adjustably fixed on the base, being provided also with linear bearings slidable on the base rails 172. The location adjustment of the sub-frame relative to the base is provided by a screw 183 rotatable in a pillow block fixed on the base and in threaded engagement with a nut fixed on the sub-frame. By manipulating the hand wheel 185 corotatably mounted on the screw, the tower or vertical frame 152 and the grooving tool can be moved toward or away from the tire axis.

To move the grooving tool perpendicular to the axis of the tire while the groove is being formed, a cylinder 192 is affixed to the sub-frame 181 and provided with a ram 194 which is coupled to a bracket fixed on the platform 167 on which the vertical frame is fixed in such a manner that the tower is movable toward and away from the tire axis in response to extension or retraction of the ram in the cylinder. This provides adjustment of the radial depth of the groove to conform with the cross-sectional curvature of the tire.

In order to control the operation of the cylinder 192 in timed relation with the movement of the grooving tool transversely of the tire, a crown template 198 is mounted on a stub shaft 201 extending vertically from a right-angle gear drive 203 fixed on the sub-frame. The input shaft of the right-angle drive is connected by a splined coupling to an intermediate shaft 205. A sprocket 207 on the intermediate shaft is connected by a flexible chain drive to a sprocket 209 on a second right-angle gear box 211 carried by the frame 152. This gear box is connected with the second right-angle gear box 213 by a splined coupling 215 which accommodates the relative movement up and down of the cross-frame on which the gear box 213 is mounted. This box 213 is connected by a drive shaft 217 which carries a sprocket 219 connected by a flexible endless chain with a sprocket 221 mounted on the screw. The driving connection of the screw with the radial depth or crown template 198 provides a timed relation between rotation of the template and the screw and correlates rotation of the template with the traverse of the grooving tool transversely of the tread. The template has a peripheral pattern which is formed or selected to correspond proportionally with the transverse curvature of the grooved depth with respect to the tire axis.

To cooperate with the pattern of the crown template, a photoelectric sensor 222 is mounted on the vertical frame 152 and provides signals in response to the movement; i.e., the rotation of the template 198 to control the operation of the cylinder 192 to move the grooving tool toward or away from the tire axis.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for forming grooves in a tire tread comprising a grooving tool having a cutting edge, a frame disposable adjacent said tire, first means mounted on said frame for moving said grooving tool transversely in the tread of a tire in accordance with a predetermined non-linear profile, second means on said frame mounting said tool for rotation, and third means coordinated with the first means for varying the orientation of said tool in response to changes in slope of said profile as said tool is moved transversely of the tire, said third means comprising template means defining a contour coordinated with said predetermined profile, follower means carried in said first means for sensing said contour and comprising a servo-valve having an actuating plunger engaging said contour, linking means connecting said follower means with said second means for varying the angular orientation of said tool to maintain its cutting edge normal to its direction of movement by said first means and including a fluid power cylinder operable in response to said valve, and gear means operatively connected to said cylinder and drivingly engaging said second means to rotate said second means in response to changes in slope of said contour during movement of said tool transversely of the tire.

2. An apparatus as claimed in claim 1 said first means for moving said tool comprising a cross-frame having a first parallel pair of slides extending horizontally, a carriage mounted slidably on said slides, a vertical frame having a second parallel pair of slides extending vertically, said cross-frame being mounted slidably on said second pair of slides, means for driving said carriage along said first pair of slides, means for varying the elevation of said cross-frame in predetermined relation with movement of said carriage.

3. An apparatus as claimed in claim 2, said means for varying elevation comprising second template means defining a profile track, sensing means for sensing said track, said second template and said sensing means being mounted respectively on said carriage and on said vertical frame for movement relatively of each other, and power means for moving said cross-frame up and down in response to said sensing means while said carriage is being moved.

4. An apparatus as claimed in claim 3, the apparatus further comprising support means including a base adapted for movement to an operative position relative to said tire tread, said base having a pair of slides fixed thereon, said vertical frame being mounted slidably on the last-mentioned slides, and crown template means and second sensing means arranged for relative movement of one with respect to the other in timed relation with the movement of said carriage and motive means drivingly connected to said base and to said vertical frame to move the latter relatively of the former in response to said second sensing means.

5. An apparatus as claimed in claim 4, said crown template means being mounted rotatably on said base, said second sensing means being mounted on said vertical frame, and drive transmission means drivingly connecting said crown template means and said means for driving said carriage, said second sensing means including a photocell disposed in operative relation with said crown template means, and said motive means including a fluid power cylinder.

6. A method of grooving a tread rubber in place on a tire comprising moving a grooving tool in a compound movement path cutting said rubber while holding said tire to prevent its rotation about its own axis, said path including three direction components of which:
   (a) the first direction component is generally parallel to the axis of the tire at a constant rate of movement;
   (b) the second direction component is generally radially of the tire axis and is at a variable rate responsive to a crown template mounted for rotation and driven in timed relation to said constant rate of movement;
   (c) the third direction component being perpendicular to a plane defined by said first and said second direction components and being at a variable rate responsive to a template having a preselected profile, and applying constant speed driving means for providing said first direction component.

7. A method as claimed in claim 6, further comprising providing a first, a second, and a third template, said first template having a profile representative of said path in a plane parallel to the axis of the tire, said second template having a profile representative of the path in a radial plane containing the axis of the tire, said third template having a profile representative of a zero angular orientation of said tool with respect to said path.

* * * * *